(12) United States Patent
Albsmeier et al.

(10) Patent No.: US 7,392,022 B2
(45) Date of Patent: Jun. 24, 2008

(54) THERMALLY FEEDABLE TRANSMITTER AND SENSOR SYSTEM

(75) Inventors: Andre Albsmeier, München (DE); Wolf-Eckhart Bulst, München (DE); Klaus Pistor, Linden (DE); Frank Schmidt, Poering (DE); Oliver Sczesny, Aschheim (DE); Claus Seisenberger, Neufrannhofen (DE); Martin Vossiek, Hildesheim (DE)

(73) Assignee: Enocean GmbH, Oberhaching (DE)

( * ) Notice: Subject to any disclaimer, the term of this patent is extended or adjusted under 35 U.S.C. 154(b) by 489 days.

(21) Appl. No.: 10/478,084

(22) PCT Filed: May 22, 2002

(86) PCT No.: PCT/DE02/01848

§ 371 (c)(1), (2), (4) Date: Jul. 20, 2004

(87) PCT Pub. No.: WO02/095707

PCT Pub. Date: Nov. 28, 2002

(65) Prior Publication Data

US 2004/0242169 A1    Dec. 2, 2004

(30) Foreign Application Priority Data

May 22, 2001    (DE) ................ 101 25 058

(51) Int. Cl.
*H04B 1/04*    (2006.01)
*G08B 1/08*    (2006.01)
*H04Q 7/00*    (2006.01)

(52) U.S. Cl. .............. 455/127.1; 455/115.1; 455/91; 340/539.26; 340/443; 340/425.5; 340/500; 340/870.01

(58) Field of Classification Search ............... 455/91, 455/115.1, 127.1; 340/870.21, 539.26, 443, 340/500, 870.01
See application file for complete search history.

(56) References Cited

U.S. PATENT DOCUMENTS 4,001,798 A * 1/1977 Robinson ............... 340/870.15
4,160,234 A * 7/1979 Karbo et al. ................. 340/443
4,300,119 A * 11/1981 Wiernicki .................... 340/447

(Continued)

FOREIGN PATENT DOCUMENTS

DE    36 43 236 A1    7/1988

(Continued)

OTHER PUBLICATIONS

Funkfernsteuerung Alpha Radiom technical data sheet, Feb. 2000.

(Continued)

*Primary Examiner*—Quochien B. Vuong
*Assistant Examiner*—Richard Chan
(74) *Attorney, Agent, or Firm*—Cohen Pontani Lieberman & Pavane LLP

(57) ABSTRACT

The transmitter which can be fed thermally has at least one heat transducer element (1) with a downstream voltage transformer (3) and logic assembly (4) as well as a data transmission unit (5, 6), and is characterized in that the logic assembly (4) is designed on a ULP basis, and the data transmission unit (5, 6) transmits a broadband signal.

31 Claims, 2 Drawing Sheets

U.S. PATENT DOCUMENTS

| | | | |
|---|---|---|---|
| 4,647,836 A | | 3/1987 | Olsen |
| 5,793,309 A | * | 8/1998 | Nellson .................. 340/932.2 |
| 6,014,869 A | * | 1/2000 | Elion et al. .................. 73/583 |
| 6,570,386 B2 | * | 5/2003 | Goldstein .................. 324/415 |
| 6,747,573 B1 | * | 6/2004 | Gerlach et al. ......... 340/870.21 |
| 6,882,128 B1 | * | 4/2005 | Rahmel et al. .............. 320/101 |
| 6,992,423 B2 | * | 1/2006 | Mancosu et al. ............ 310/339 |

FOREIGN PATENT DOCUMENTS

| | | |
|---|---|---|
| DE | 37 03 030 A1 | 9/1988 |
| DE | 44 24 773 A1 | 1/1996 |
| DE | 198 28 170 A1 | 12/1999 |
| DE | 199 33 815 A1 | 1/2001 |
| WO | WO 98/36395 | 8/1998 |

OTHER PUBLICATIONS

J.M. Rabaey et al., "Picoradio Supports Ad Hoc Ultra-Low Power Wireless Netowrking", IEEE Computer Society, Long Beach, vol. 7, No. 33, Jul. 2000, pp. 42-48.

Erik McShane et al., "Functionally Integrated Systems on a Chip:Technologies, Architectures, CAD Tools, and Applications", IEEE Computer Society, Innovative architecture for future generation high-performance processors and systems, Oct. 22-24, 1997, pp. 67-75.

Erik McShane et al., "A Monolithic RF Microsystem in SOI CMOS for Low-Power Operation in Radiation-Intense Environments", 2000 IEEE Aerospace Conference Proceedings, Mar. 18-25, 2000, pp. 421-429.

Robert Brodersen et al., "Wireless Systems-On-A-Chip Design", 2001 International Symposium on VLSI Technology, Systems and Applications, proceedings of technical papers, 2001, pp. 45-48.

R. Amirtharajah et al., "Self-Powered Signal Processing Using Vibration-Based Power Generation", IEEE Journal of Solid State Circuits, vol. 33, No. 5, May 1, 1998, pp. 687-695.

Walter Ludsteck, "Bald beginnt der Weg ins Internet an der Steckdose", Süddeutsche Zeitung Nr. 74, Mar. 29, 2001, p. 27.

* cited by examiner

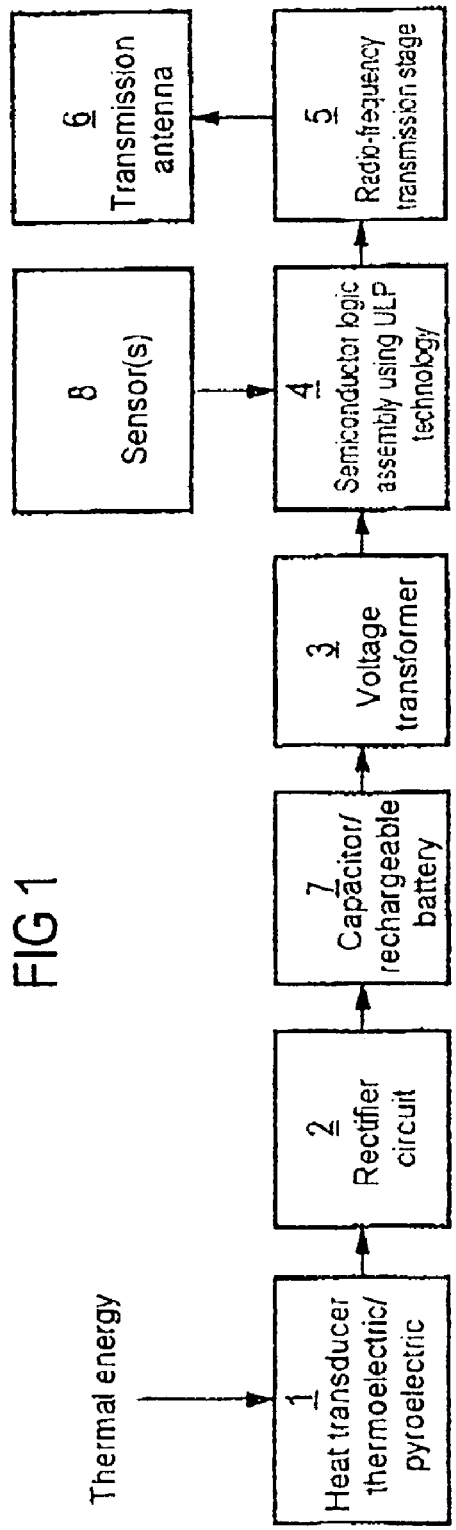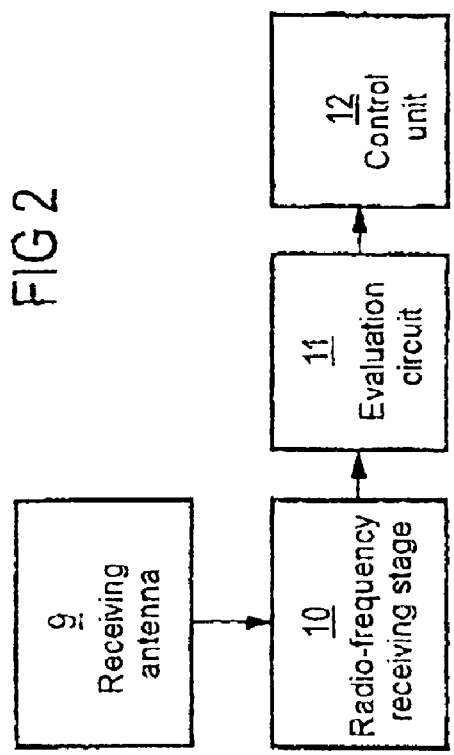

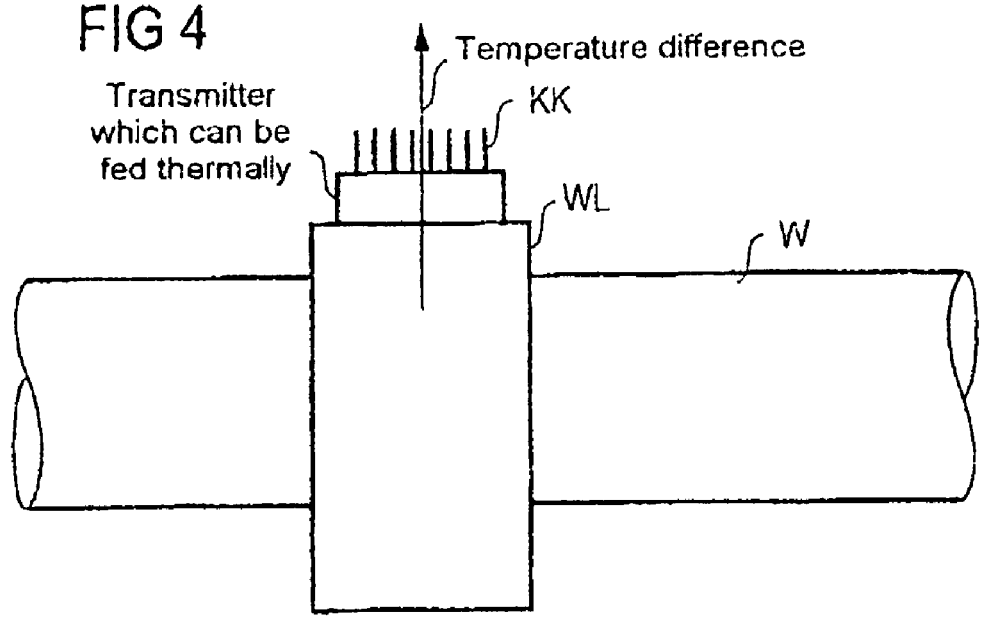

THERMALLY FEEDABLE TRANSMITTER AND SENSOR SYSTEM

This is a U.S. national stage of application No. PCT/DE02/01848, filed on 22 May 2002.

The invention relates to a transmitter which is fed thermally, to its use, to a method for thermally fed transmission of a signal, in particular of a radio signal, and to a system for monitoring and/or control.

By way of example, DE 36 43 236 C2 discloses systems in which mechanical energy is converted to electrical energy, and is then rectified. This electrical energy is used to operate simple resonant circuits.

WO 98/36395 describes a method for producing coded radio-frequency signals, in which thermal energy is converted to electrical energy, and the low-frequency electrical energy is converted to radio-frequency electrical energy via an element with a nonlinear characteristic. This radio-frequency energy is used in order to transmit a narrowband radio-frequency signal, which contains specific information.

The data sheet relating to "Funkfernsteuerung Alpha Radio" [Radio Remote Control, Alpha Radio] contains typical operating data for a portable radio remote control.

The object of the present invention is to provide one option for thermally fed information transmission with low activation energies and an increased information density.

This object is achieved by means of a thermally fed transmitter as claimed in claim 1, by means of a method as claimed in claim 17, by means of an application as claimed in claim 20, and by means of a system as claimed in claim 22.

For this purpose, the transmitter has at least one heat transducer element with a downstream voltage transformer. The voltage transformer ensures that an essentially constant voltage can be tapped off at least over a short time period. This avoids voltage spikes, and improves the operational reliability.

A logic assembly designed on a ULP (Ultra Low Power) basis is connected to the voltage transformer with the words Ultra Low Power in this case preferably being understood to mean a power consumption of less than about 15 mW, and in particular less than 10 mW. A power consumption of between 3 mW and 8 mw is particularly advantageous. The logic assembly contains at least one sequence controller for controlling the transmission stage. A data transmission unit is connected to the logic assembly, and is controlled by it.

The signals which are produced by the data transmission unit are broadband signals, in contrast to previous methods, such as those described in WO 98/36395 or "Funkfernsteuerung Alpha Radio" [Radio Remote Control, Alpha Radio]. This results in the advantage that, although the energy consumption per unit time is higher than in the case of narrowband transmission, more information can, however, also be transmitted per unit time, so that overall, this allows a higher data transmission rate and reduced energy consumption. This is particularly important when only small amounts of energy can be used, for example temperature gradients.

It is preferable for at least one heat transducer element to be a thermoelectric transducer (thermal transducer). This uses a spatial temperature difference to produce the voltage. For this purpose, it is typically thermally connected on the one side to a heat-transmitting part, and on the other side to the environment (possibly via an auxiliary apparatus such as a heat sink KK). The hot and cold sides can always be interchanged.

If there is no usable spatial temperature difference in the measurement environment, it is advantageous for at least one heat transducer element to be a pyroelectric transducer, by means of which thermal energy can be converted to electrical energy on the basis of the pyroelectric principle, in which a change in temperature over time is converted to an electrical voltage.

The energy supply can advantageously be assisted by the additional use of solar cells. This also allows the transmitter to be operated when no adequate temperature difference is available, but there is an adequate light intensity. The particularly low-power design of the transmitter allows particularly small and cost-effective photovoltaic elements to be used.

In order to improve the efficiency, it is advantageous for the voltage transformer to be equipped with a further energy storage element, preferably an inductance. This is particularly advantageous when the voltage transformer circuit is operated on a clocked basis.

A voltage transformer with a high efficiency and a wide input voltage dynamic range is preferably used, according to the prior art, for voltage stabilization. If the charge voltage across the capacitor then falls during operation from, for example, 20 V to 5 V, a stabilization circuit produces a constant 3 V at the output.

For power-saving operation, the logic assembly is advantageously designed such that all the functions are operated for as short a time as possible (energy management), in particular in the range of milliseconds, especially for an activation duration between 0.3 ms and 5 ms, and preferably between 0.5 ms and 2 ms.

In order to improve the data protection, it is advantageous for the logic assembly to be connected to a memory in which an identification code is stored. By way of example, this memory may be integrated in the logic assembly.

For reliable operation of the logic assembly, it is also advantageous for it to have at least one rectifier circuit connected upstream of it. The rectifier and the voltage transformer may be connected directly or via an additional electrical energy storage element, for example a capacitor or a rechargeable battery with an associated circuit. Since the currents that are generated are very small, a circuit which saves an extremely large amount of current is required. (See invention application, Thermal voltage generator). When a capacitor is used, for example, a downstream voltage transformer can convert a typically exponentially decaying charge voltage on the capacitor to a voltage which is constant at least for a short time.

The heat transducer element may also itself store the electrical voltages. The electrical energy storage element ensures that an energy supply is available for a sufficiently long time to send the information.

If an adequate voltage signal is available for supplying energy to the logic assembly, then the logic assembly transmits data, for example an identification code and sensor measurement signals, to the data transmission unit, which generates a transmission message containing the data to be transmitted, and transmits this over a broad bandwidth.

It is preferable for the logic assembly to be connected to at least one sensor. Measurement data from the at least one sensor can then be recorded and read by the logic assembly applied to the transmission message, interrogating one or more sensors. There is no restriction to the choice of sensors; for example temperature sensors, force sensors (pressure, weight, torque, etc.), count sensors or switch state sensors may be connected. The measurement data may also, however, be processed in a different manner, for example being digitized, in the logic assembly.

It is advantageous for the logic assembly to contain a microprocessor or an ASIC module.

Some of the electrical energy which is produced by the heat transducer element is typically used to raise the logic assembly to an operating state. An oscillating crystal is normally provided as a clock transmitter for this purpose. In order to shorten the time for starting up the logic assembly, it is advantageous for the clock transmitter to be an LC resonant circuit or an RC resonant circuit rather than an oscillating crystal.

In order to achieve a high data transmission rate, it is advantageous for the data transmission device to transmit a signal at a frequency of f>1 MHz. By way of example, frequencies f of between 100 MHz and 30 GHz are now technically feasible. Advantageous frequency ranges are bands at 433 MHz, 868 MHz, 2450 MHz (+915) and/or at 5.8 GHz at 24 GHz. There is no fundamental upper limit to the frequency.

In order to achieve a high data throughput rate within a short time, it is advantageous for the bandwidth of the transmitted signal to be at least 100 kHz, and in particular between 300 kHz and 600 kHz. The net amount of data transmitted is preferably 32 bits to 512 bits.

A transmission time of less than 3 ms, and in particular between 0.5 ms and 2 ms, is likewise advantageous.

The data transmission unit preferably operates with an SAW resonator as the frequency-determining component.

An error-tolerant transmission method is preferred, in particular using the so-called forward error correction or a block-oriented redundancy method.

It is likewise advantageous to transmit the data in a very short time for collision protection when two or more transmitters are present in the reception area of the evaluation electronics.

If a sufficiently long-term voltage supply is available, it is advantageous for two or more transmission messages to be transmitted completely more than once successively, since this achieves better transmission reliability.

In order to improve the protection against eavesdropping, it is advantageous for the transmission message to be scrambled, typically by means of scrambling logic which is integrated in the logic assembly. This also makes it possible to improve the transmission reliability by entering individual keys, for example for access control. In particular, when transmitting two or more transmission messages, it is advantageous for each of the radio-frequency signals to be scrambled differently, for example using a different key.

In order to suppress transmission interference, it is also advantageous when transmitting two or more transmission messages to vary the time interval between them and/or to use different frequencies for them.

In order to improve transmission reliability once again, in particular in environments where there are two or more transmitters, it is advantageous for the transmission of the transmission message to be delayed in time, for example by means of a variable, for example random, setting of a delay. The delay can be produced, for example, in the logic assembly software.

It is preferable for the logic assembly, during one transmission cycle, at least
  to read the identification code, for example from a memory in the logic assembly;
  to generate a transmission message which contains at least the identification code and, possibly, other information such as measurement data from sensors;
  to activate the data transmission unit and to transmit the transmission message, possibly scrambled and/or delayed in time, via it.

The transmitter which can be fed thermally can advantageously be used, inter alia, in:
  temperature sensors for heat cost distribution;
  temperature sensors for domestic purposes, in particular in cookers, ovens, refrigerators, domestic appliances;
  sensors in an automobile and in other vehicles;
  temperature sensors and other thermally operated sensors on machines, systems, vehicles etc. in industry.

It can also advantageously be used in building technology, in particular for installation engineering, for example for controlling electrical systems or for access control.

The list of applications is not complete; in fact, the transmitter can be used universally.

Individual aspects of the transmitter will be explained in more detail in the following text. The transmitter is not, of course, restricted to these examples.

a) Energy Analysis
  The electrical energy in a bending transducer is assumed to be: $E=\frac{1}{2}\,C\cdot U^2=\frac{1}{2}\,50\cdot 10^{-9}\cdot 50^2$ [$V^2$ As/V]=62.5 µWs, leaving approximately 50 uWs assuming that the transducer efficiency is 80%. An electronic circuit which, for example, requires about 20 mW (3 V and 6.6 mA) can thus be operated for a time period of t=50 µWs/20 mW=2.5 ms. The logic assembly and the data transmission unit can thus be operated for a short time with little energy as well.

b) Data Transmission
  i) Transmission rate and amount of data
  Assuming that a data transmission unit in the form of a radio-frequency transmitter is modulated at a rate of 100 Kbit/s, then a total amount of about 250 bits of data can be transmitted in this time. This amount of data is sufficient for scrambling, and also offers the capability to increase the transmission reliability by repeated transmission or by the use of correlation methods.

c) Data Transmission Unit
  A power of 1 mW to 50 mW is basically required to transmit data reliably to any point within a private dwelling (when using a radio-frequency transmitter). In this case, one typical scenario is for the transmission messages from all the transmitters to be received by a single receiver which initiates the appropriate actions (for example heating control).

d) Receiving System
  The receiving system typically has one receiver and one processor-based signal processing unit. The system receives the transmission messages which are transmitted from the transmitter, and these are temporarily stored and processed. The receiving system can be coupled to one or more transmitters to form a system.
  The receiving system is preferably connected to or integrated in a power line communication (PLC) modem see, for example, the Süddeutsche Zeitung [South-German Daily Newspaper] dated Mar. 29, 2001, No. 74, page 27. A transmission message which is transmitted by the transmitters can be introduced to a PLC network by means of the PLC modem. This allows a control system to be formed which can be remotely controlled by means of PLC technology, for example for remote diagnosis, maintenance and control.

The method of operation of the thermally fed transmitter is illustrated schematically in the following exemplary embodiments.

FIG. 1 shows various functional units of a thermally fed transmitter,

FIG. 2 shows a receiving unit,

FIG. 3 shows a temperature sensor using the transmitter which can be fed thermally, and FIG. 4 shows an apparatus for monitoring a bearing temperature.

In FIG. 1, first of all charge separation and hence a voltage are produced by supplying thermal energy in the heat transducer element 1, preferably a thermoelectric or pyroelectric transducer.

This voltage is used, via a rectifier circuit 2, to charge an electrical energy storage element in the form of a capacitor 7 or rechargeable battery. The voltage transformer 3 can likewise also be fed directly, with the heat transducer element 1 itself, for example, storing the charges. The subsequent voltage conversion is advantageous in order to produce a constant voltage over a short time period from the exponentially decaying charge voltage across the capacitor 7.

The output voltage from the voltage transformer 3 is used to activate the downstream logic assembly 4 and the data transmission unit (in this case: the radio-frequency transmission stage 5) and to supply them for as long as the stored energy allows.

The logic assembly 4 contains a microprocessor sequence controller, a memory in which the identity of the transmitter is stored and, optionally, sensor inputs via which the measurement values from one or more connected sensors 8 can be read in.

The radio-frequency transmission stage 5 produces a radio-frequency oscillation which is transmitted over a broad bandwidth via a transmission antenna 6. The transmission message produced by the logic assembly 4 is modulated onto this oscillation.

If a sufficient amount of energy is available, then the following processor-controlled sequence is initiated, inter alia, in this exemplary embodiment:
a) the identification code is read;
b) measurement data is read from the connected sensors 8, with the measurement values being digitized and/or preprocessed;
c) the data is scrambled;
d) a transmission message is generated, containing at least the identification code and the measurement data from the sensors 8;
e) the radio-frequency transmission stage 5 is activated and controlled;
f) the radio-frequency oscillation is modulated with the transmission message (possibly more than once, as long as sufficient energy is available or until some other termination criterion is reached).

Further steps may, of course, also be provided. In addition, the steps may be carried out in a different time sequence, for example the steps a) and b) and/or d) and e) may be interchanged or carried out at the same time.

As an alternative to the transmission of radio-frequency signals, other types of data transmission may also be used, for example optical transmitters, Bluetooth, etc.

FIG. 3 shows an apparatus for monitoring a cooking process.

Cooking processes for foodstuffs in large kitchens, bakeries and in the private domestic environment require a high degree of care and continuous readjustment of the heating power and other parameters. The cooking process can be monitored by monitoring the temperature and other parameters. The cooking process can thus be controlled optimally, and with energy being saved, with less care.

Until now, programs which run automatically once they have been started have been used for this purpose. However, these have the weakness that the weight and condition of all the constituents and of the cooking containers must be determined and taken into account in advance. Closed-loop control is impossible. Solutions are likewise known in which the temperature of the item to be cooked is determined by means of plug-in wire-connected sensors (the connecting cable is a disadvantage) or by means of the external temperature of cooking containers by measuring the thermal radiation (this has the disadvantage that the temperature of the item to be cooked is measured indirectly and this is feasible only with specially coated saucepans, etc.). Despite the stated disadvantages, these do in fact allow closed-loop control of the cooking process.

The monitoring apparatus described in this exemplary embodiment comprises the transmitter which has been described above can be fed thermally, and can determine the relevant data in the item to be cooked or in the cooking container and can then transmit this data, for example by radio. The data can then be passed to a control device which thus provides closed-loop control for the heating process. An automatic system such as this for closed-loop control of cooking process may, of course, also control two or more cooking processes at the same time.

The monitoring apparatus is designed such that it operates at the temperatures which occur during the cooking process. The thermal energy which is available in the cooking container or in the item to be cooked is used for operation of the monitoring apparatus.

The monitoring apparatus is highly flexible and can be used in particular without the need for special cooking containers, since it can be introduced directly into existing saucepans, etc. or into the item to be cooked. The transmission antenna 6 is in the form of a thin wire which, in the case of metal saucepans, projects slightly out of the closed lid. The monitoring apparatus is encapsulated such that it is dishwasher resistant, and can be handled like normal cooking equipment.

In addition to this universally usable variant, it is also possible to fit the monitoring apparatus permanently in a cooking container. This is preferably done at positions in which the thermal load of the electronics is kept within limits, and which at the same time provide an adequate thermal gradient. Particularly in the case of permanent installation, sensors 8 for the detection of moisture, filling levels and conductance values may also be provided in addition to a pure temperature sensor system.

The receiving system receives the transmission messages transmitted from the sensor for the item to be cooked, controls the cooking process (for example by adjusting the temperature of the hotplate), and/or indicates it (for example the remaining cooking time).

FIG. 4 shows a side view of an apparatus for monitoring a bearing temperature.

Temperature monitoring is required in many different fields of application in order to monitor an operating capability and, in the event of an excessively high or excessively low temperature, to initiate an appropriate reaction in order, for example, to allow preventative system maintenance or diagnosis of the wear profile or the like.

If the part to be monitored is equipped with a temperature sensor which is connected via a cable to a central signal processing facility, this results in considerable complexity for cable laying and its design. Furthermore, it would then not be possible to monitor many parts of the system (or monitoring would be possible only with a high degree of complexity) since a cable connection is impossible, or is more difficult, since they move.

In this exemplary embodiment, the bearing temperature is monitored by fitting the apparatus to a shaft W via a shaft bearing WL in which a transmitter S which can be fed thermally is provided, having at least one sensor 8 in the form of a temperature sensor. The temperature sensor may be fitted to or in the shaft bearing WL, and the data is transmitted via radio. The proposed solution can be constructed such that it is very compact, and requires no connecting cables whatsoever and no maintenance. Since no parts subject to wear (for example batteries) need be maintained, the housing of the entire arrangement can be hermetically sealed, thus also improving the reliability. Finally, no cable laying is required for the installation, and all that is necessary is to inform the system controller that a new temperature monitoring point has been installed.

In this exemplary embodiment, the heat transducer element 1 is a thermal transducer, in which, preferably, one of its ends is connected to the system part to be monitored while its other end is connected to a point which is relatively cool (for example in the event of the temperature of the system part to be monitored being excessive). This is typically a heat sink or the housing. Since the voltages that are produced are relatively small, the thermal transducer advantageously comprises a series circuit and/or a parallel circuit formed by a large number of thermoelectric generator elements.

The logic assembly 4 monitors the measurement value from the temperature sensor 81 for a (possibly preset) limit value TGRENZ being exceeded. If the temperature falls below or rises above TGRENZ, then the logic assembly 4 generates a transmission message and sends it via the data transmission unit 5, 6 to a system controller, which is equipped with an appropriate radio receiver 9, 10 for this purpose. This transmission message may contain not only the temperature T at the measurement point but also, for example, an identification code and/or additional information. Independently of this, the profile of the temperature T may optionally be permanently stored in the logic assembly 4 in order, for example, to be available for diagnosis purposes after a system defect.

This may be a single process, or the transmission may be carried out cyclically for as long as the temperature is above the limit. In addition, a message can be transmitted when the temperature reaches or falls below the limit value or, for example, the transmission message may include the time since the temperature exceeded the limit value. Finally, it is also possible to use two or more limit values, for example for an initial warning, an alarm and for system disconnection.

In particular, it is advantageous to use at least one sensor 8 in which even small amounts of energy can change a measurement value. It is thus possible to detect a state change whose energy transfer is too small for operation of the transmitter. The sensor 8 is advantageously an accumulating sensor in which a measurement value which is integrated over time is detected by the energy transfer.

By way of example, a temperature profile may be stored in a nonvolatile memory as the sensor 8, with the memory preferably being in the form of an extremely low-energy EEPROM memory. Analog storage methods may also be used, for example discharging of at least one capacitor or vaporization as a result of a temperature influence, the discharging of electret materials by radioactive radiation (accumulated radiation load), electrochemical reactions such as hydrolysis, magnetic storage methods, etc. for (generally integrating) storage of temperature influences and other measurement variables.

As soon as a relatively large amount of energy is then available, for example as a result of a sufficiently steep temperature gradient or as a result of external energy being supplied (for example via a radio-frequency field), the entire temperature history or a part of it or the accumulated measurement value is transmitted by radio.

In general, it is advantageous for the transmitter to have as a discrete component or, for example, integrated in the logic assembly a monitoring unit, for example a threshold value switch, which initiates the transmission process when a specific adequate amount of energy is exceeded.

The invention claimed is:

1. A transmitter which can be fed thermally, comprising:
   at least one heat transducer element having a downstream voltage transformer, said downstream voltage transformer transforming voltage of the at least one heat transducer element into a constant voltage level having at least a short time period;
   a logic assembly configured on an ultra low power basis, said logic assembly being connected to the voltage transformer and having sequence control; and
   a data transmission unit connected to the logic assembly, said data transmission unit transmitting a broadband signal.

2. The transmitter as claimed in claim 1, wherein the logic assembly configured on the ultra low power basis has a power consumption of less than 10 mW.

3. The transmitter as claimed in claim 1, wherein a bandwidth of the broadband signal is more than 100 kHz.

4. The transmitter as claimed in claim 1, wherein the logic assembly includes a clock timer comprising an LC resonant circuit or an RC resonant circuit.

5. The transmitter as claimed in claim 1, wherein the at least one heat transducer element is a thermal transducer by which thermal energy is convertible into electrical energy based on thermoelectric principles.

6. The transmitter as claimed in claim 1, wherein the at least one heat transducer element is a pyroelectric transducer by which thermal energy is convertible into electrical energy based on pyroelectric principles.

7. The transmitter as claimed in claim 1, wherein a rectifier circuit is disposed subsequent to the at least one heat transducer element.

8. The transmitter as claimed in claim 1, further comprising an additional electrical power supply which comprises a solar cell.

9. The transmitter as claimed in one claim 1, wherein electrical energy emitted from the at least one heat transducer element is storable in at least one electrical energy storage element.

10. The transmitter as claimed in claim 1, wherein the voltage transformer is operable on a clocked basis.

11. The transmitter as claimed in claim 1, wherein the data transmission unit includes a frequency-determining component comprising a SAW resonator.

12. The transmitter as claimed in claim 1, wherein the logic assembly is connected to at least one sensor.

13. The transmitter as claimed in claim 12, wherein the at least one sensor is an accumulating sensor.

14. The transmitter as claimed in claim 1, wherein the transmission unit is a radio-frequency transmission stage by which a radio-frequency signal at a frequency of more than 1 MHz is transmittable.

15. The transmitter as claimed in claim 1, further comprising a delay apparatus disposed between the logic assembly and a transmission antenna of the data transmission unit.

16. The transmitter as claimed in claim 1, wherein the logic assembly is connected to memory, in which an identification code is stored.

17. The transmitter as claimed in claim 1, wherein the transmitter is operated such that a transmission message is transmitted within a time period of 0.3 ms to 5 ms.

18. The transmitter as claimed in claim 17, wherein two or more transmission messages are transmitted successively.

19. The transmitter as claimed in claim 18, wherein at least one of a time interval and a frequency of the transmission messages are variably adjustable with respect to each other.

20. The transmitter as claimed in claim 17, wherein information in the transmission message is scrambled.

21. The transmitter as claimed in claim 1, wherein the transmitter enables one of heating, cooking and system engineering.

22. A system for at least one of monitoring and control, comprising:
   the at least one transmitter as claimed in claim 1; and
   at least one unit for at least one of indicating data which is transmitted from the at least one transmitter and controlling at least one apparatus which is monitored by the transmitter, based on received data.

23. The system as claimed in claim 22, wherein the system performs temperature monitoring.

24. The transmitter as claimed in claim 2, wherein a bandwidth of the broadband signal is more than 100 kHz.

25. The transmitter as claimed in claim 24, wherein the bandwidth is between 300 kHz and 600 kHz.

26. The transmitter as claimed in claim 3, wherein the bandwidth is between 300 kHz and 600 kHz.

27. The transmitter as claimed in claim 9, wherein the at least one electrical energy storage element is a capacitor or a rechargeable battery.

28. The transmitter as claimed in claim 14, wherein the frequency is between 100 MHz and 30 GHz.

29. The transmitter as claimed in claim 17, wherein the time period is between 0.5 ms and 2 ms.

30. The transmitter as claimed in claim 20, wherein the information in the transmission message is scrambled if two or more transmission messages are scrambled differently.

31. The system as claimed in claim 23, wherein the temperature monitoring comprises one of cooking area and system monitoring.

* * * * *